RECOGNITION SYSTEM FOR READING MACHINE

Filed Sept. 15, 1966 5 Sheets-Sheet 1

INVENTORS
Arthur W. Holt
James D. Hill
BY Joseph A. Genovese
ATTORNEY

RECOGNITION SYSTEM FOR READING MACHINE

Filed Sept. 15, 1966 5 Sheets-Sheet 2

INVENTORS
Arthur W. Holt
James D. Hill
BY Joseph A. Genovese
ATTORNEY

INVENTORS
Arthur W. Holt
James D. Hill

BY Joseph A. Genovese
ATTORNEY

July 7, 1970 A. W. HOLT ET AL 3,519,990

RECOGNITION SYSTEM FOR READING MACHINE

Filed Sept. 15, 1966 5 Sheets-Sheet 4

INVENTORS
Arthur W. Holt
James D. Hill

BY Joseph A. Genovese
ATTORNEY

RECOGNITION SYSTEM FOR READING MACHINE

Filed Sept. 15, 1966 5 Sheets-Sheet 5

INVENTORS
Arthur W. Holt
James D. Hill
BY Joseph A. Genovese
ATTORNEY

United States Patent Office 3,519,990

Patented July 7, 1970

3,519,990
RECOGNITION SYSTEM FOR READING MACHINE

Arthur W. Holt, Annapolis, and James D. Hill, Takoma Park, Md., assignors to Control Data Corporation, Rockville, Md.

Filed Sept. 15, 1966, Ser. No. 579,680
Int. Cl. G06k 7/00, 9/00
U.S. Cl. 340—146.3 5 Claims

ABSTRACT OF THE DISCLOSURE

An optical character reading machine capable of reading characters in a line of print, which touch and/or overlap. This is accomplished by a scanner examining a small area progressively along the line and noting the positions at which the optimum corelation signals occur. From this information the nominal pitch of the printed characters is determined and trigger signals corresponding to the nominal pitch are provided to the machine to read the characters of the line.

This invention relates to the recognition systems of optical character reading machines, and particularly to the problems encountered when a reading machine is required to identify touching and/or partially overlapping characters.

The invention deals with the problem of recognizing characters which are touching by making use of the fact that most type written and business machine printed characters of a line have a reasonably fixed, constant pitch. The invention will be described by first referring to a primitive and inefficient form.

Assume that a reading machine embodying the invention is to read a line of characters all of which touch, and that the line has no breaks due to separation of words or for any other reason. Assume, moreover, that when the characters touch, the junction may resemble another character as, for example, when two "O's" touch they may form an "X" between them, or when two "X's" touch, the space between them may resemble an "O." The reading machine scans the character by means of vertical slices which are, for example, 5 mils wide. This means that the machine uses 200 vertical scans per inch. The machine examines the characters through what is called a "window," which is ⅛" wide. The window will always be tall enough to enclose the full height of each character, and the ⅛" width is sufficient to include the widest character. This window represents an area on the paper which will be covered by 25 adjacent scans whose data is processed by the recognition logic internally of the reading machine. This logic may be of any type, such as optical mask comparison, an electronic shift register with correlation devices, a feature analysis network, or any other. The important point is that the window ⅛" wide is going to move along the line of characters (assume from left to right) and constantly examine the image contained in the window for a possible character.

Let us then start reading the line by moving the window over it and record the result of reading every 5 mils of window motion. At first the window will cover nothing but "white" paper to the left of the line. Since we find no character in the window, we shall record the first positions as rejects or as a space in a memory. The window will eventually cover the beginning of the line and still see no recognizable character and we shall continue to record reject codes. Finally, the window will begin to register on the first character and, at each 5 mil position record the "best character" match and the quality of the match. For example, if a good character match is represented by 10 volts, we shall record that fact and so on down to "reject" at some particular value, say 4 volts. It will be obvious that as the window moves to the right, eventually it will be superimposed on the first character and we will have a good match and will so record the character identity. As the window continues to move to the right, the match voltage will drop but we will still see some possible character. If the first two characters are "O's," we shall note that as the window is centered between the OO's, the machine will record a good match for an "X." Then the match voltage will drop at successive positions and rise again for a good match at the second "O," etc.

Assume that the line is 3" long. Since we are recording 200 readings per inch, we shall then records 600 possible characters or rejects together with 600 "degree of match" voltages. If we examine the distribution of these voltages after the line had been scanned, we shall find that they have a phase repetition which rises to high values at the center of each character and, generally speaking, falls to low values between characters. Occasionally some of the spaces between characters may produce good voltages, but on the average, the rise and fall of the voltage will match the average positions of the characters. Thus, if the characters were printed ten to the inch, we should expect thirty good peaks centered approximately on the characters, with a few extra peaks due to false readings as mentioned above. If a phase detector is used to recognize repetitive voltages and if one knows that the repetitive voltages have to be more or less evenly spaced, one can then deduce the correct characters from this repetitive pattern. In fact, if the pitch of the line being read is either 8, 9, 10 or 12, the pattern can be detected by testing for the specific 8, 9, 10 and 12 pitches by specific circuits designed for these pitches.

It is obvious that making character tests and recording the character names and their match quality at every position of the window is an inefficient process. This can be improved by recording the character identity and its quality, not at every scan, but at every third or fourth scan, for example. This means that as the window is moved 5 mils, the character and its voltage is temporarily stored, the window is moved another 5 mils, the cycle is repeated, the window is moved another 5 mils and the temporary storage is again repeated and finally the best character found during the three successive positions and its quality is recorded. The temporary storage can be achieved by storing a charge on a capacitor, or digitally, or in any other manner. In this way, instead of 600 final recordings for a 3" line, we would only have 200 recordings and would still be able to read the characters of the line since the match voltage does not change radically from one character to another when the window is moved only 5 mils.

It should be further obvious that since characters are not printed on perfectly even pitch due to the maladjustments of typewriters and/or other equipment, the phase relationship of the best match signals will not be perfectly evenly spaced, that is, the pitch will not be perfectly constant, but, in fact, will contain a considerable amount of jitter to the left and right of the average position. This is taken care of by accepting the best character in the approximate center of each correct phase position, as described in detail later. It should be emphasized that this reading system does not finally determine and read out the most probable character at each position of the window, but only determines the tentative character identities at each position and that a later examination, after a group of characters have been scanned, is used to finally fix the identity of each character by making use of the fact that the characters have a constant, or a predictable, or a computable position. The tentative characters that obviously do not fit into the regular pattern of character spacing are rejected as false.

It would appear that the more characters one examines before the phase relationship is determined, the more certain one can be of the pitch and position of the characters. However, the use of too many characters in my method to determine pitch and phase, leads to difficulties because paper dimensions are not constant and more than a single typewriter or more than one typewriter operation may be used in typing the same line. We therefore make use of spaces when they are available to re-start the determination of the characters and because of the paper stretch and shrinkage and uncertainty of pitch, we generally prefer to use not more than 1" or 2" of a line for my purposes. In practice, ten to twenty characters are more than enough to determine the pitch, and by using only such a small number of characters, the memory requirements for storing each character identity and the quality of match become quite reasonable.

BACKGROUND

Typically, reading machines are made of a scanner to extract information from the characters and their background, a data processor having character criteria to which the scanner-extracted data is compared, and a comparator responsive to the processed compared data for providing signals that identify the scanned character.

With few exceptions, reading machines rely upon detection of the clear space alongside of a character to determine when to either make a decision on the character identity or to start a routine leading to the decision function. An example of a machine relying upon the clear space alongside of a character to trigger the comparator (decision function) is found at FIG. 2 in U.S. Pat. No. 3,167,744. Obviously, when no clear space exists alongside of a character, such a reading machine cannot identify the character. Touching printed characters exemplify the problem, and the same is true of characters which have vertically overlapped portions (assuming the usual vertical line scanning).

PRIOR ART

There have been prior efforts to solve the problem of reading touching characters. A few are mentioned below.

Pat. No. 3,199,080 discloses a reading machine which scans a line of printed characters in one direction and then the other (e.g. left-to-right and then right-to-left). When scanning in one direction the first character of a touching pair can be identified because it has a clear space preceding it. When scanning in the opposite direction, the other character of the touching pair can be identified for the same reason.

The above procedure is slow because each line of characters must be examined twice. It is expensive because additional storage for the identities of the characters must be provided. Moreover, the system fails when there is a group of three touching characters to be identified. The center character will be rejected.

Pat. No. 3,219,974 discoses a system for reading touching characters contained within a larger sample wherein some of the characters are spaced. The system operates as follows: a sample of characters is examined and the existing spaces (in the sample) between characters are detected and their positions noted. From this the printing pitch is computed, e.g. the characters are printed $n$ to the inch. A signal of a frequency corresponding to the pitch $n$ is provided by a flywheel circuit, and that signal is used to trigger the comparator as the sample characters are read. The theory is that the flywheel circuit will provide trigger signals where the spaces between characters should be, regardless of whether spaces are actually present.

This system will enable touching characters to be read, but it has certain undesirable features. To practice that system as disclosed, a prescanner is desirable if not essential. Also, if one character of the sample is badly horizontally misregistered, the trigger signal for identifying that character can occur when the character is only partially scanned even though the characters of the sample (from which the frequency is computed) are truly spaced at a pitch of $n$ to the inch.

A fair comment on the above system is that it makes a great deal of use of the spaces between those characters which are actually spaced. It will enable the reading machine to read touching characters, but there are unusual instances (as described) where it is possible for the system to fail.

Pat. No. 3,303,466 discloses another system by which touching characters can be read. This system relies upon the detection of a condition at which there is a very good likelihod that the character being examined is approaching complete registration with the reading machine, to provide a signal which initiates a sampling routine. This system is (or can be) completely independent of the existence of a clear space alongside of the character.

More specifically, as a character is scanned, the scan data handled by the reading machine processor is examined. When a threshold correlation is reached, the best of successive correlation signals of the precessor circuits are stored for a preselected succeeding time, or number of scans, or the like. After storage, the comparator is triggered to select the best of the stored signals as representing the scanned character.

This system does not rely upon the space alongside of a character, and it does not attempt to compute print pitch by relying upon a sample group of characters as Pat. No. 3,219,974. Although the system operates well, it occasionally experiences some difficulties. For example, if the characters are poorly printed the preset threshold correlation may not be reached until a character has passed the positions at which the system is designed for initiation of the sampling routine. In such a case, the system may effect the trigger timing adversely for the next character. Also, the first character of a touching pair is always read without difficulty, and the same applies to the second character in the vast majority of instances. If there is a third touching character, the system occasionally disturbs the clock timing of the machine as follows.

The sample storing routine is commenced in real time as the character data courses through the machine. In other words, the threshold correlation value which starts the sampling routine can occur when the character is from 60% to 95% scanned (or the data coursing through the machine so corresponds). The number of samples taken is fixed. Thus, if two successive characters are 90 or 95% completely examined before starting the sample routine, the third character sometimes has its leading portion clipped (missed).

The above difficulty can be (and has been) corrected. but this requires resynchronizing devices and/or dynamic adjustment of threshold correlation values and other complications.

THE INVENTION

Our invention has the same objective as those described above, namely, to enable a reading machine to identify all characters more effectively, particularly touching and/or overlapping characters. To accomplish this, however, the invention embodies a concept which is to determine the most probable character identities within a sample of a line of print, detect the phase distribution of the characters and from this, deduce the true positions of the characters for recognition. For reading a line of characters, the entire line can be the sample or, to conserve storage, we can select a specific length of print (e.g. one inch) and have the sample length progress along the line to its end.

It is stressed that in a simple form of the invention, any possible spaces between characters are neglected. Although existing spaces can be ignored, in another form of our invention they can be used. When used, they will provide trigger signals directly, i.e. not in the manner of Patent No. 3,219,974 (to predict the print pitch from character spacings and develop a corresponding frequency from a flywheel circuit).

An object of the invention is to provide means to enable a reading machine to identify touching characters in a more effective way.

A further object of the invention is to provide means responsive to the average positions of several characters after they have been tentatively identified to determine the true identity of one of the several characters.

Another object of my invention is to provide a reading machine with means enabling it to identify touching characters, while avoiding the numerous deficiencies or prior systems to accomplish a similar result. A feature of the invention is the option which it provides to make use of a decision trigger signal if it can be derived from an existing clear space between characters as printed, or to neglect the space and rely entirely upon our system which does not depend on such clear spaces to instruct the machine to make a character-identity decision.

Another object of the invention is to provide a recognition system for a reading machine, wherein a plurality of tentative identity signals for each character of a group are recorded, and from information obtained from the optimum positions of several characters of the group, a computation decides the optimum position for recognition of one of the characters of the group. This is conveniently accomplished by triggering the record of tentative identity signals to yield the signal recorded for the above mentioned optimum position.

Other objects and features will become apparent in following the description of the drawings.

FIG. 1 is a block diagram showing the relationship of a simplified form of the invention with conventional reading machine components.

FIG. 1*a* is a group of curves and diagrams to aid understanding of the invention.

FIGS. 2 and 2*a* taken together form a schematic view showing another embodiment of the invention.

Figures 1, 1A:
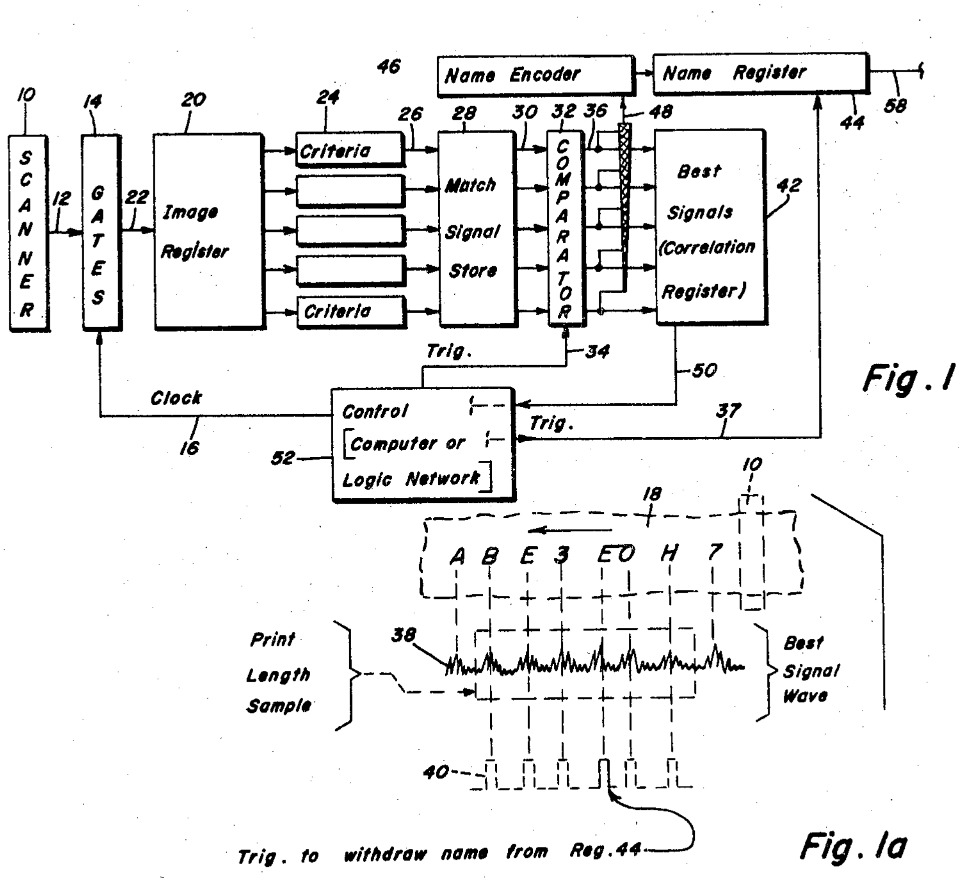

SIMPLIFIED SYSTEM, FIGS. 1 AND 1*a*

One of the major accomplishments of our invention enables reading machines to recognize characters completely independently of spaces between printed characters. This is done by determining the optimum position of the character (usually the scanner-extracted data describing the character) by a computation based upon the position of this character itself and the positions of other characters of a sample. This concept can be demonstrated in a simplified embodiment such as shown in FIGS. 1 and 1*a*. For a more comprehensive embodiment based on the above concept and other concepts and features, attention will be later directed to FIGS. 2–5.

In addition to the subject matter used to practice the invention, FIG. 1 schematically shows the components of a conventional reading machine, e.g. as in Patent No. 3,104,369. These include a photosensitive scanner 10 whose amplified signals are conducted over the wires in cable 12 to the register-loading gates 14. The gates are strobed by clock signals in line 16 in time with one component of scan motion, e.g. as document 18 (FIG. 1*a*) moves relative to the scanner. Thus, the scanner-extracted data regarding the characters is gated into the image register 20 via the conductors of cable 22.

As the data courses through the image register, it is compared to the character criteria 24, e.g. voltage or current adders. There is ordinarily at least one criterion for each character in the machine vocabularly. The nature of the criteria is such that correlation signals are provided on lines 26, and the optimum signal for each criterion is stored in the match signal storage device 28 which can assume any suitable form, e.g. a group of capacitors.

The correlation signals for the individual possible characters are conducted on lines 30 from device 28 to comparator 32. The comparator is triggered by a signal on line 34 at the "proper" time, whereby a signal on one of the character identity lines 36 from comparator 32 is yielded. In the prior art, the above "proper time" is usually determined by detecting the clear space alongside (preceding or succeeding) a character as its image moves. So far, this description is generally applicable to numerous conventional reading machines, i.e. a scanner 10, a data processor 14, 20, 24 and 28, a comparator 32, and suitable control circuits as at 52.

Our invention does not rely upon detection of a clear space alongside of a character to trigger the decision function. As shown in FIG. 1*a*, at "EO" there may be no space. Instead, our system examines the correlation signals as the character describing data for several characters course through the reading machine. From this examination a computation of optimum position which the character had occupied is made to trigger the decision function for each character. The correlation signals for all possible characters can be examined (not shown) as they are made available on lines 26 or lines 30. It is simpler to examine only the optimum correlation signals (shown) on lines 36, i.e. the outputs of comparator 32. In such a case, the wave form 38 of FIG. 1*a* for the characters on document 18 is typical. This wave can be integrated, differentiated and shaped to provide trigger signals 40 keyed to the characters (or their scan-extracted data) as shown in FIG. 1*a*. Signals 40 are conducted on line 37, but this is more fully described later .

In FIG. 1, the trigger signals on line 34 are provided at a frequency considerably greater than the character pitch. They can be provided, for example, after each clock pulse on line 16 (one per vertical scan). The resulting signals on lines 36 and their values are stored in the best signal correlation register 42. The capacity of register 42 is sufficient to store a number of signals for each character of a print sample, e.g. as in FIG. 1*a*. While the correlation signals are being stored in register 42, the identity of the characters represented by the signals are likewise stored in the same register (not shown) or in a synchronized name register 44 as follows.

Name encoder 46 is connected by the conductors of cable 48 with lines 36. The line which conducts a signal at each examination instant (time of trigger signal on line 34), conducts a signal which is encoded at 46, and the character name code is entered in register 44. A printed character can have more than one identity coded for it as its data courses through image register 20.

As the values of the best correlation signals are stored in register 42, corresponding value signals (represented at 38, FIG. 1*a*) are conducted on line 50 to a control device which can be a conventional digital (or analog) computer 52 or a logic network as shown for the embodiment of FIGS. 2–5. The computer computes a serially provided signal 40 for each character of the sample by utilizing the optimum position correlation signals fed to the computer on line 50, for the character to be identified and for the others in the sample. This is a continual process in the sense that as the print length sample (FIG. 1*a*) moves relative to scanner 14, printed characters enter the sample at one end and leave it at the other end. The portion of the sample selected for reading is immaterial, e.g. the center or the right end can be used with equal results.

Upon computation of the optimum position of the character data for reading, the computer provides a trigger signal 40 on line 37 to withdraw the stored character name code from register 44 and output it on line 58 to a utilization device. In reading, it is understood that the character name codes for the character as examined in several positions has been stored in register 44, and the trigger signal on line 37 withdraws only one code for each character, and the selected code is the one corresponding to the name of the character given at the optimum positions of the character itself and the adjacent characters.

Since FIG. 1*a* is described in terms of using a computer for both computation and control, for simplicity we have shown clock signal line 16 and trigger signal line 34 under the control of computer 52.

FIGS. 2–5

Figure 2A:
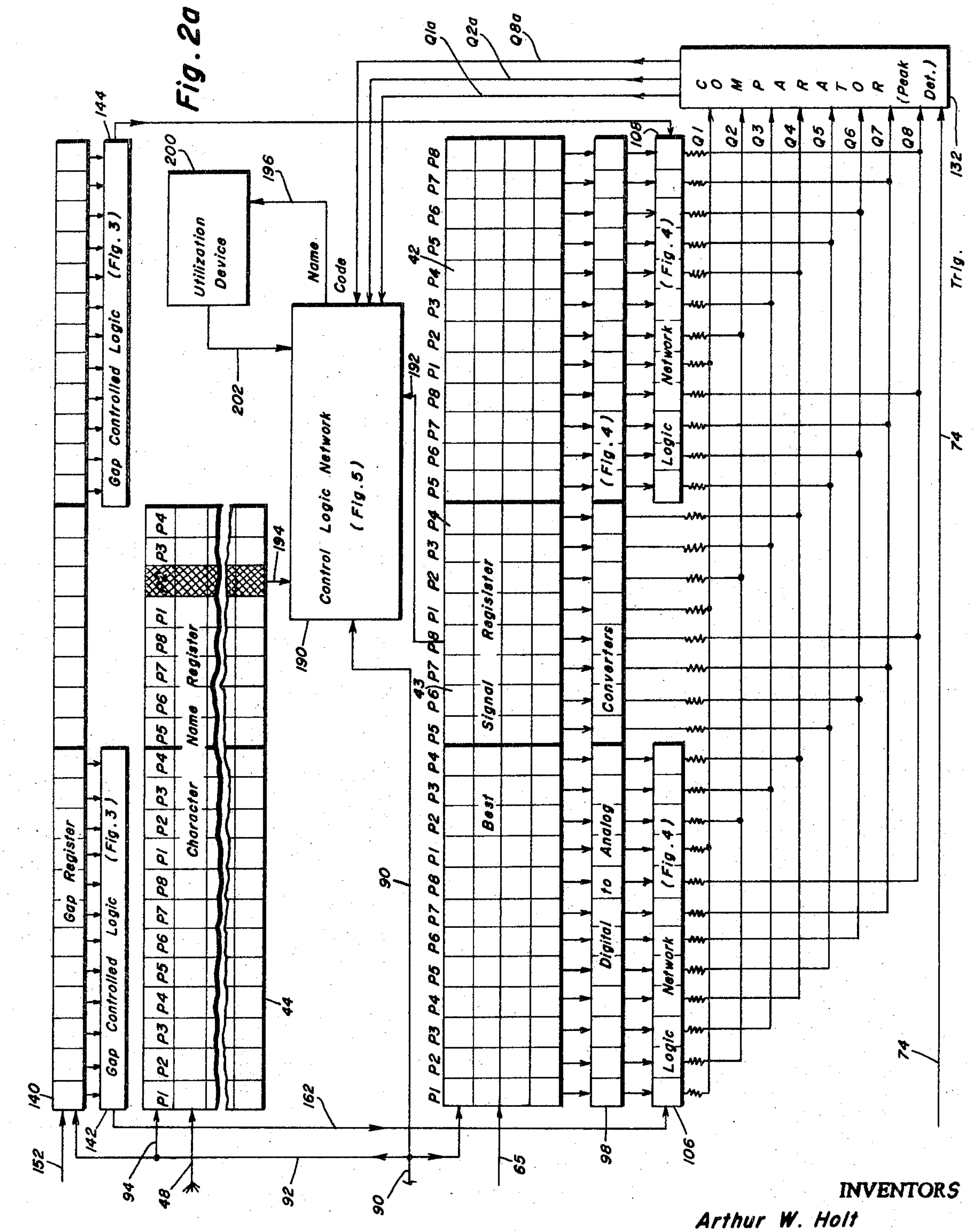
Figures 2, 3:
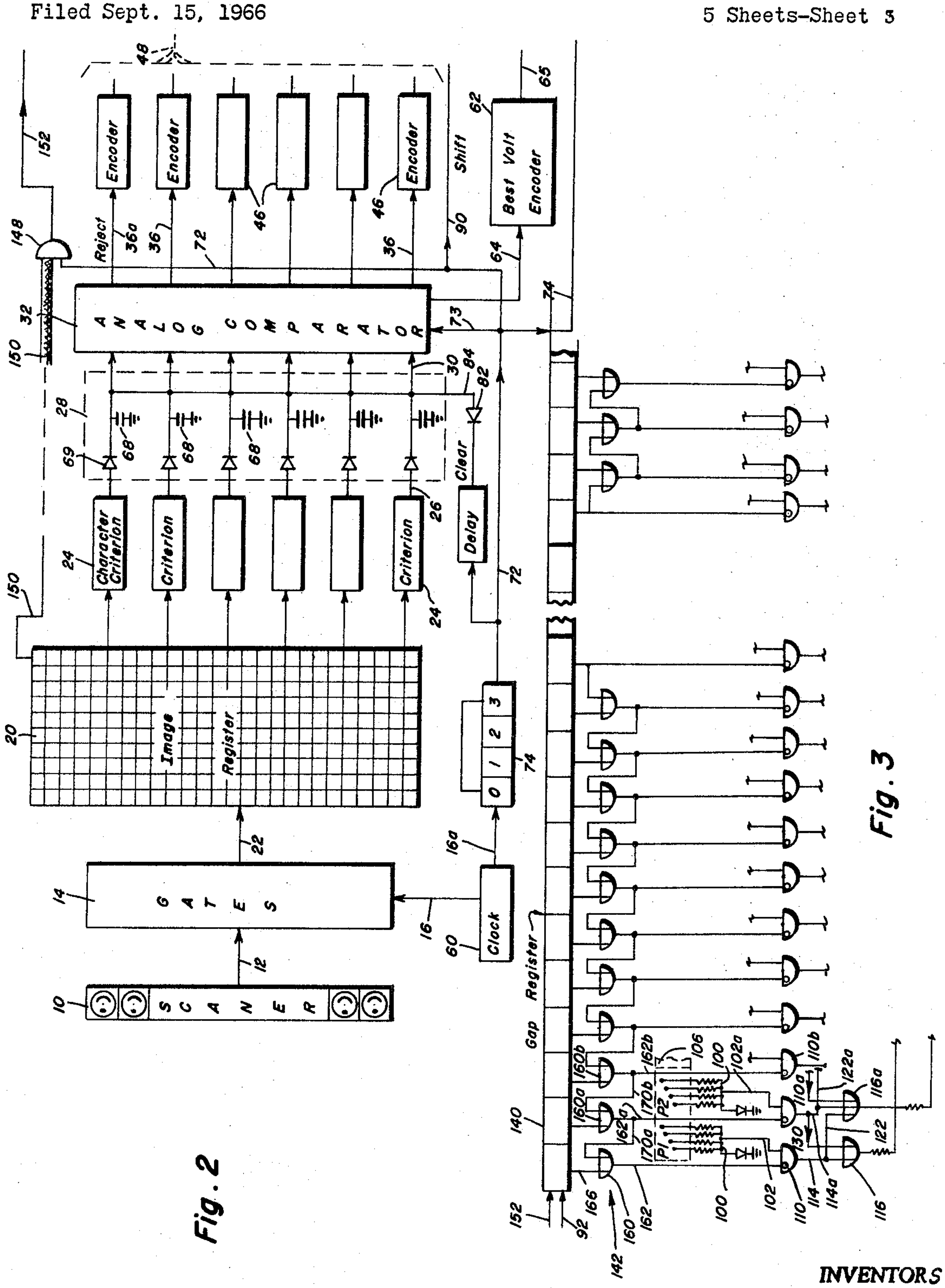
FIG. 3 is an enlarged view showing the details of the gap controlled logic represented in FIG. 2*a*.

FIGS. 2 and 2*a* taken together, illustrate a reading machine made capable of identifying characters independently of clear spaces between printed or otherwise formed characters. This embodiment differs from that of FIG. 1 by being more detailed and by inclusion of additional features. For instance, instead of computer 52, we have shown special circuits to perform the required computations and to exercise control over the machine. Also, while our system is fully operative by neglecting existing clear spaces between characters (also called gaps in FIG. 2*a*), detected gaps can be used to provide a decision trigger as described later.

FIGS. 2 and 2*a* have components or subassemblies corresponding to the equivalent components or subassemblies in FIG. 1, and they are identified by similar reference numerals. Accordingly, the machine in FIGS. 2 and 2*a* has a photosensitive scanner 10 whose outputs are conducted on the wires of cable 12 to the loading gates 14. The gates are strobed in time with one component of scan motion by clock signals on line 16 from clock source 60. The scan data passed by gates 14 is conducted to image register 20 by way of cable 22.

The character-describing data coursing through register 20 is compared to the character criteria or standards 24, and correlation signals from the various criteria are conducted over lines 26 to the match signal storage device 28. The optimum correlation signals for each possible character (those stored by device 28) are conducted on lines 30 to analog comparator 32 which selects the optimum stored signal for output on one of the lines 36 of the illustrated group, there being one line for each possible character. The name of the selected character is encoded by one of the encoders 46, and the code is stored in the character name register 44 by being conducted on the lines of cable 48.

The optimum correlation signals from comparator 32 are encoded by the best voltage encoder 62 which is connected to comparator 32 by cable 64. The encoder outputs are conducted as binary codes to the best signal register 42 by way of cable 65. The best signal register and particularly the circuits associated therewith (located above and below register 42 in FIG. 2*a*) constitute the means, in a large part, for performing the computation and control functions that computer 52 performs in the embodiment of FIG. 1. This subject matter will be described in detail later. As of this point in the description, the components and subassemblies common to the embodiment of FIG. 1 and of FIGS. 2, 2*a* have been mentioned. Their operation can be briefly summarized as follows: As the images of characters are swept across the photosensitive scanner 10, analog signals (representing white, gray, and black) are extracted, amplified and conducted to the image register loading gates 14. These gates are strobed by signals on clock pulse line 16 in time with one component of scan motion, e.g. motion of the document containing the printed characters. As the character describing data courses through register 20, it is compared to the character criteria which can assume numerous forms. For example, the character criteria can be resistance or current adders designed to provide concurrent correlation signals on all of the lines 26. The signals on these lines are stored on capacitors 68. Unidirectional devices such as diodes 69, are interposed in the lines 26 ahead of the capacitors 68.

This form of the invention departs from the embodiment of FIG. 1 at this point. Where the embodiment of FIG. 1 illustrates the storage of optimal correlation signals and the sampling thereof by comparator 32 after each scan (slice) of the print length sample, we have elected to illustrate an alternative in FIG. 2, namely, the sampling of the stored correlation signals on capacitors 68 after each group of scans (slices) of the print length sample. Specifically, the analog comparator 32 is sampled or triggered by a signal on sample trigger lines 72 and 73 after each group of three scans of the character sample. This is accomplished by a three stage ring counter 74 operated by clock signals conducted on line 16*a* from clock source 60, and from which the sample trigger line 72 extends. Thus, when the ring counter steps to the end, i.e. its third stage, the counter automatically resets and provides a sample trigger on line 72 which triggers analog comparator 32 via conductor 73. After a short delay, the capacitors 68 are cleared so that they can be used to store the optimum correlation signals from the character criteria 24 during the next three scans of the print length sample. This is accomplished by conducting the sample trigger signal on line 72 through delay 80 so that it can be impressed on lines 26 through diode 82 interposed in line 84. The line 84 extends from delay 80 and is conductively connected with lines 26. The polarities of diodes 69 and 82 enable loading and clearing of the capacitors for a given polarity system, and it is obvious that the system will operate equally as well with all of the diodes reversed so long as polarities of signals are maintained consistent therewith.

The optimum correlation signal selected by comparator 32 for each three scans of the print length sample is encoded at 46 and is conducted to the character name register in the form of a binary code. The stages or code positions in register 44 are designated P1, P2, P3 . . . P8, P1, P2, P3 . . . P8, P1, P2, P3 and P4. The designation refers to "Phase 1" etc., where each phase cornation refers to "Phase 1" etc., where each phase corresponds to a group of three scans of the print length sample. One of the purposes of handling the data in the form of groups of three scans each, is economy. The advisability of doing this is dictated in a large part by the desired resolution of the reading machine.

Inasmuch as the character name register is a digital device, it is possible to use a self-clocking scheme for loading the name register. However, to preserve the fine timing and synchronism of the entire machine, we prefer to use the sample trigger signals on line 72 as loading pulses for the character name codes. Therefore, we have shown conductor 90 attached to the sample trigger line 72 and to line 92 which is connected with the character name register 44 by means of conductor 94. The line 90 continues to the control logic network schematically represented in FIG. 2*a* and shown in detail in FIG. 5 (described later). The line 92 continues (downwardly as shown in FIG. 2*a*) to provide loading pulses for the best signal register 42. Thus, registers 42 and 44 are synchronously connected. As the character name code is loaded in name register 44, the binary code on cable 65 signifying the value of the best correlation signal is stored in register 42. This register also has its stages or code positions designated P1, P2, P3, etc. to correspond to the resignations of the code positions of the name register 44.

In the majority of reading machines, provision is made to provide an uncertainty or rejection signal when the the reading machine cannot determine the identity of a character with sufficient certainty. This is generally acomplished by providing a threshold which must be exceeded before a character is identified. An example of a machine so equipped is found in U.S. Pat. No. 3,104,369. Thus, one of the lines 36*a* is designated as a reject line, and encoder 46*a* provides the reject code. This code is stored in the character name register 44 just as though it were a character name. In a like manner a poor correlation signal (or no signal) is conducted on line 64 to be encoded at 62 and stored in the best signal register 42 concurrently with the reject code storage in register 44.

Figure 4:
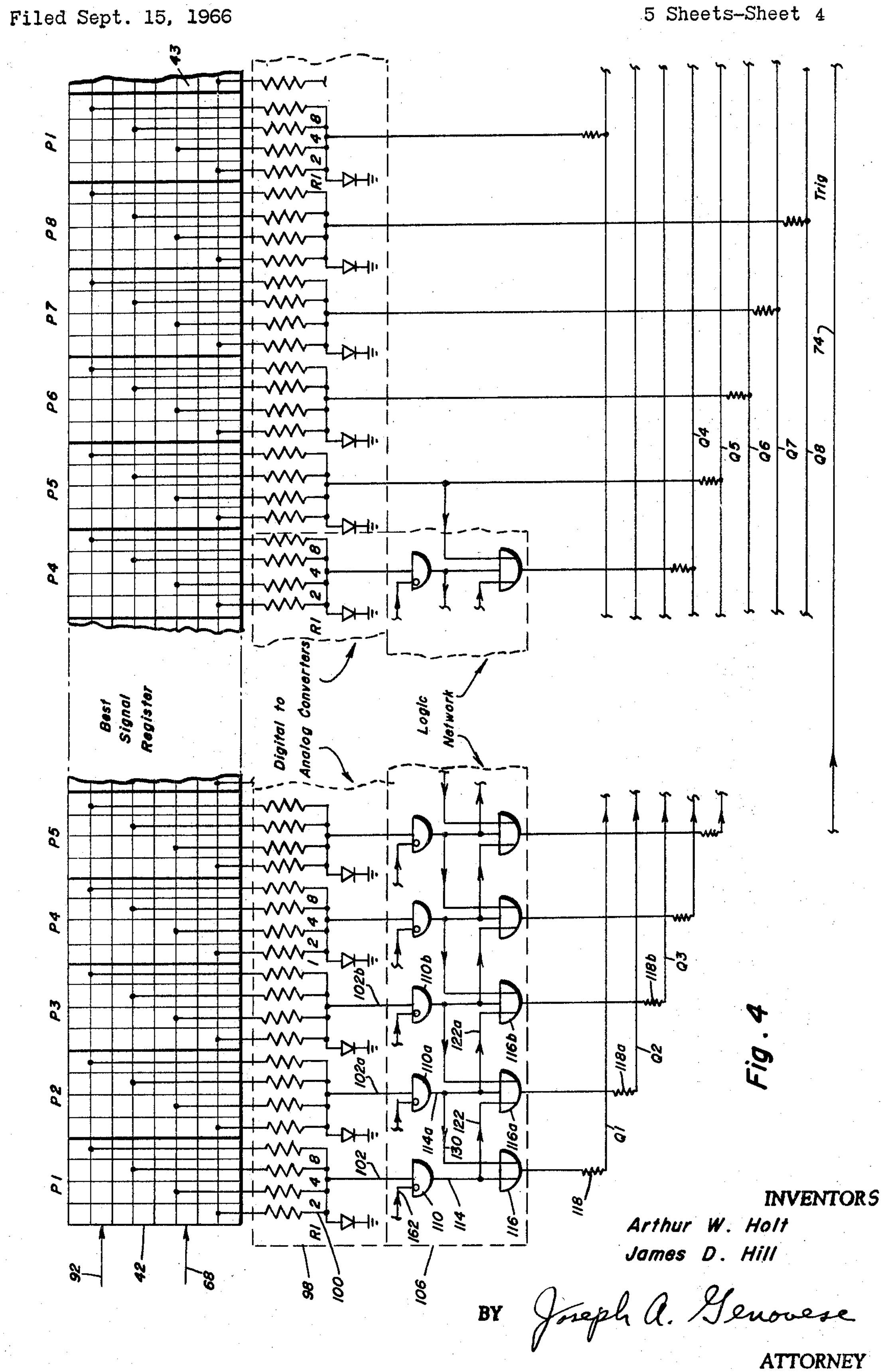
FIG. 4 is an enlarged view showing the details of the logic network and of the digital to analog converters of FIG. 2*a*.

Attention is now directed primarily to the best signal register 42 in FIG. 2*a*, the circuits beneath it in this figure, and to FIG. 4. First, however, the purpose and function of the best signal register and the circuits associated with it is as follows: The best correlation signals stored in register 42 which have been integrated to the extent of representing the best signals over every third scan of the print sample, are examined to ascertain the optimum position of one of the characters of the sample based not only on its own position but also based on the optimum positions of other characters in the print length sample. It must be remembered that the storage of the best correlation signals in register 42 is synchronized with the scanning of the character and/or the coursing of the character-describing data through some other portion of the reading machine, e.g. image register 20. Although this synchronization is designed in our machine, this is not an essential inasmuch as we have character name register 44 which retains the identity (name) of each character in the print length sample. Thus, while it is desirable to have registers 42 and 44 swnchronized to simplify the circuitry, it is not essential to have these registers and the balance of the machine synchronized.

FIG. 4 shows a fraction of the best correlation signal register 42 on enlarged scale and also digital-to-analog converters 98 connected to all of the code positions P1, P2, P3, etc. The digital-to-analog converters consist of adders 100 whose resistive branches are of values corresponding to the binary notational form 1, 2, 4 and 8. The branches of each adder are connected to the respective binary notational bit positions in each of the code positions of the best signal register 42. Thus, the analog signals representing the values of the binary codes stored in register 42, are conducted on the converter output lines 102, 102*a*, 102*b* . . . 102*n* which would be located at the right hand extremity of the digital-to-analog converters in FIG. 2*a* (not fully shown in FIG. 4). The analog signal lines 102, 102*a*, 102*b*, etc. for the first twelve stages of register 42 (FIG. 2*a*) are connected to a first logic network 106, while the analog signal lines from the converters of FIG. 4 corresponding to the last twelve stages of register 42, are connected as inputs to the logic network 108 to the right side of register 42. The center section 43 made of eight stages of register 42 (indicated at P5, P6, P7, P8, P1, P2, P3 and P4) have their analog signal lines connected directly to a network including lines Q1, Q2 . . . Q8 (described later). In other words, the analog signal lines from the digital-to-analog converters at the left and to the right ends of register 42 are connected to logic networks 106 and 108, and the outputs of the logic networks are connected to a cross-bar network of lines. However, the center section 43 of the register 42 delineated by dark vertical lines for identification purposes, uses digital-to-analog converters, but the outputs (the analog signal conductors) are attached directly to the cross-bar network for reasons described later.

The logic networks 106 and 108 (FIG. 2*a*) are identical and therefore only network 106 is shown in detail in FIG. 4. The network 106 consists of a set of inhibit gates 110, 110*a*, 110*b* . . . 110*n*, there being one inhibit gate 110 for each of the lines 102, 102*a*, 102*b* . . . 102*n*. The inhibit terminals of inhibit gates 110, 110*a*, 110*b* . . . 110*n* are connected with the gap control logic by lines 162, 162*a* . . . 162*n* (FIG. 3) shown schematically near the top of FIG. 2*a* and described later. For the present it is sufficient to understand that a function will be performed in the logic networks 106 and 108 when a gap (space between characters) is detected by the reading machine. Assuming at this time that no signals are emitted from the gap control logic of FIG. 3, the analog signals on lines 102, 102*a*, etc. pass the gates 110, 110*a*, 110*b*, etc in this way. Assume that a character code reaches the first stage of register 42, and the analog of that code is four volts which passes gate 110 and is conducted on line 114 through OR gate 116, resistor 118 and is impressed on line Q1. At the same time OR gate 116*a* passes the four volt signal because it is conducted by line 122 which is attached to line 114 and which forms an input to OR gate 116. Thus, the output of OR gate 116*a* is conducted to line 22 through resistor 118*a*. No signal is conducted on line 130 from gate 110*a* to OR gate 116 because we assumed that a correlation signal code has not yet reached stage P2 of register 42.

Now let us assume that another best correlation signal (from encoder 62, FIG. 2) is loaded in the register 42 thereby stepping the previous code from position P1 to position P2. Assume that the newly-loaded code has an analog of eight volts. The eight-volt signal will pass gates 110 and 116 to be impressed on line Q1. At the same time this eight-volt signal will pass gate 116*a* via lines 114 and 122, and will be impressed on line Q2. The now-present four volt signal on line 102*a* will be conducted on line 122*a* to the line Q3 by way of gate 116*b* and resistor 118*b*. The four-volt signal on line 102*a* is conducted on line 114*a* to reach gate 116*a* but has no effect inasmuch as the eight-volt signal conducted on line 122 to the same gate 116*a* is the larger of the two signals. Although the four-volt signal on line 114*a* is also fed back over line 130 to OR gate 116, this signal has no effect, inasmuch as line 114 to gate 116 is conducting an eight-volt signal which is the larger of the two and it is this signal which passes gate 116 to be impressed on line Q1. In the manner described above, signals can be traced from the left side of logic network 106 to the end thereof. At the center portion 43 (center selected arbitrarily) of register 42 (FIG. 2*a*) and more particularly the converters associated therewith, the analog signal lines are directly resistively coupled to lines Q1–Q8. The effect of the logic network 106 and 108, therefore, is to give precedence to or stress the best of the stored correlation signals (best character positions) while the eight phase positions at the center section 43 of register 42 have the analog values of the stored signals applied directly to the lines Q1–Q8, without OR gating of the signals at the adjacent positions.

The lines Q1–Q8 form inputs to a comparator 132 (FIG. 2*a*) and the configuration of the comparator is preferably a peak detector which is triggered by a signal on line 74 attached to the sample trigger line 72. Thus, after each group of three scans, the line Q1–Q8 having the best signal (e.g. the highest) thereon is selected. It may be necessary to interpose a brief delay in line 74, however, this is a matter of design. The comparator has three output lines Q1*a*, Q2*a* and Q8*a* which are operatively connected with the control logic network 190 at the center of FIG. 2*a* and shown in detail in FIG. 5. The purpose of control logic network 190 is to complete the computation as to the optimal position of a character for reading based upon its own position as represented by the signals stored in the center section 43 of register 42, and the adjacent characters represented by the plurality of correlation for each character stored to the right and to the left thereof in the same register. The logic control network 190 also calls the character names, in turn, from the character name register 44.

However, before leaving the logic networks 106 and 108 of FIG. 4, attention is directed to the gap register 140 and the gap control logic 142 and 144 (FIG. 2*a*)

because these have a bearing upon the operation of the logic networks 106 and 108. We have provided means to detect the clear space along side of a printed character. These means as such are common in the art and can be represented by an AND gate 148 whose inputs conducted on cable 150 are connected to the negation (not "black") terminals of a column of stages of the image resistor. The AND gate 148 is strobed by the sample trigger signal on line 72, and the output signal of the gate 148 is conducted on line 152 to load a space or gap information bit into the gap register 140 in time with the phase sampling (one sample for each three scans of the print length sample). As shown in FIG. 2*a*, the sample trigger signal on line 72 is used to step the gap register by conducting the sample trigger signal to register 140 by way of lines 90 and 92.

Attention is now directed to FIG. 3. This view shows how the gap register control logic 142 is operatively connected with the logic network 106, and it is understood that the gap control logic is similarly connected with the logic network 108. What happens is this: when a space between characters is detected, the output of gate 148 (FIG. 2) representing this, is loaded in the register 140 and is stepped along to the right in synchronism with the loading of the name register 44 and the best signal register 42. The gap control logic consists of a series of OR gates 160, 160*a*, 160*b* . . . 160*n* there being one gate for each stage of the gap control register with which control logic 142 is associated. The output lines 162, 162*a* . . . 162*n* of OR gates 160, 160*a*, etc. are connected to the inhibit terminals of gates 110, 110*a*, 110*b*, etc. respectively (FIG. 4). Thus, when a gap is first detected and that information is loaded in register 140, the information will be in the form of a binary bit in the first stage of register 140. This will result in an output on line 166 from gap register 140, which is conducted through OR gate 160 and impressed on the inhibit terminal of gate 110 via line 162. Thus, whatever the analog signal of the code which is stored in the best signal register 42 in the first phase position P1, the effect of that signal is cancelled as it cannot pass gate 110 and reach line Q1. The converters 100 for the phase positions P1 and P2 of register 42 are reproduced in FIG. 3 to show this relationship. We have also illustrated a fragment of the logic network 106, i.e. analog OR gates 116 and 116*a* together with their output resistive couplings with lines Q1 and Q2.

The gating at 160, 160*a*, etc. of gap control logic 142 is arranged in a manner such that as the bit representing a gap is propagated to the right in register 140, all of the stored signals in register 42 behind the gap information bit are effectively cancelled in the sense that their analog signals cannot pass their respective inhibit gates 110, 110*a*, 110*b*, etc. This is accomplished by feed back lines such as lines 170*a*, 170*b* . . . 170*n* connected between the output lines of OR gates 160, 160*a*, etc. ahead of the succeeding OR gate to which it is an input. In other words, feed back line 170*a* is connected to the output of gate 160*a* and serves as an input to the preceding gate 160. Feedback line 170*b* is connected to the output line of OR gate 160*b* and forms an input to OR gate 160*a*. This construction is similar for all of the OR gates of the gap control logic 142. There is an identical arrangement for the gap control logic 144, except the inhibit flows ahead of the direction of motion of the gap information bit in register 140 instead of trailing it. The circuitry for accomplishng this is fragmentarily shown on the right side of FIG. 3 and is obvious in the light of the description of the logic circuits at 142.

Figure 5:
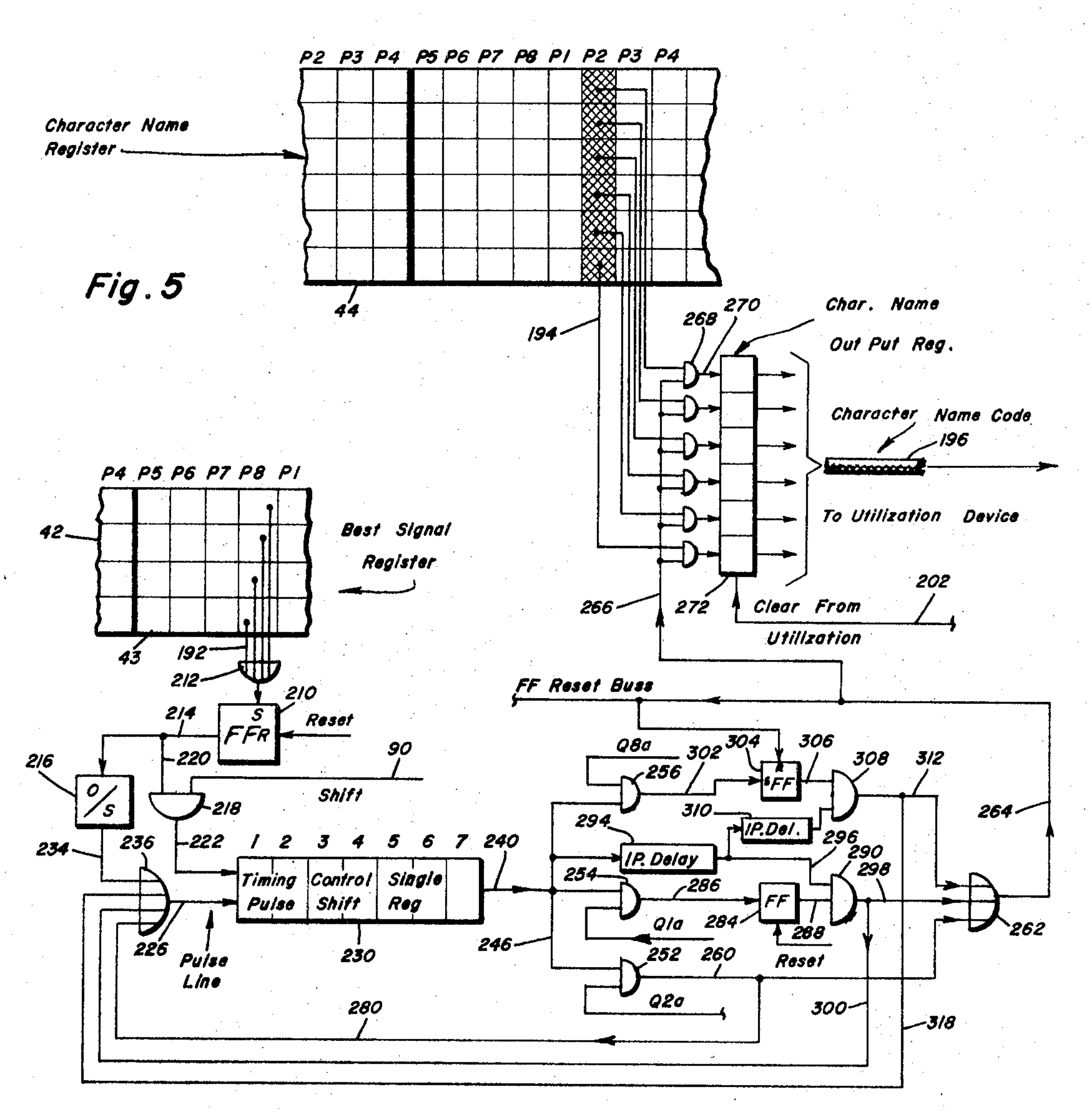
FIG. 5 is a fragmentary view showing the details of the control logic network of FIG. 2*a*, which selects the predicted optimum character position at which the character name (identity) is obtained from the name register.

Attention is directed to the logic control network 190 in FIG. 2*a* and then to FIG. 5 showing the details. The logic control network 190 is functionally represented with the following input-output lines or cables. The three comparator output lines Q1*a*, Q2*a* and Q8*a* are shown terminating in the logic control network. Cable 192 (FIG. 2*a*) is connected between the second P8 position in the best signal register 42 and terminates in the logic control network. Shift pulse line 90 is connected to network 190, and cable 194 from the P2 position of the character name register is connected with network 190. An output cable 196 extends between network 190 and utilization device 200, and there is a receipt signal line 202 extending from the utilization device 202 network 190. The construction and operation of logic control network 190 is best understood by reference to FIG. 5, however, the general purpose of network 190 is to call the character identity (name) from name register 44 at the time that our system determines that a character is or has been in optimal position for identity. Network 190 also transmits the name of the character to utilization device 200.

It must be remembered in this embodiment of the invention tentative character identity decisions are made after each "phase" (defined as three scans of the print length sample or the coursing of corresponding data through other portions of the machine). The tentative decisions are represented by the best correlation signal codes which step through register 42 while the name of the character tentatively identified steps synchronously through register 44. The determination of the optimum position of the character within the sample for ultimate decision is made primarily by the circuits shown schematically in FIG. 2*a*. The best phase correlation signals on both sides of the center phase section 43 of register 42, are logically processed by networks 106 and 108 before being conducted to comparator 132 while the best phase signals at the center section 43 of register 42 are used directly by the peak detector comparator 132.

During the examination of a print length sample, it can be expected that for the first few phases, uncertainty codes will be (rejects) entered into register 42. To simplify the disclosure it can be assumed that the uncertainty code is 0000 where binary 0 is represented either by a given polarity to which flip-flop 210 (FIG. 5) does not respond, or by a zero volt signal for the same reason. Thus, as the uncertainty codes step through register 42 and enter stage P8 within section 43 of register 42, none of the bit positions of that P8 stage will provide signals over the conductors of cable 192. Accordingly, no signal can pass OR gate 212 to set flip-flop 210. However, as soon as a character identity tentative decision code enters the P8 stage of register section 43, flip-flop 210 is set thereby providing a signal on line 214 which fires a one-shot multivibrator 210 and also produces a steady state input signal for AND gate 218 via line 220. The only other input of gate 218 is the shift pulse line 90, described before. AND gate 218 has an output line 222 connected to the stepping terminal of the timing control, single-pulse shift register 230. The necessary single bit to be stepped through register 230 is entered into the register over pulse line 226 by way of OR gate 236. Thus, when the initial uncertainty codes have passed and the first correlation code enters phase position P8 of register section 43, the resulting flip-flop signal on line 214 fires the one shot multivibrator 216. Its signal on line 234 passes OR gate 236 to be entered as a pulse in the first stage of timing register 230. Thereafter, the pulse in register 230 will be stepped with each shift signal provided on line 90 (FIGS. 2, 2*a* and 5).

When register 230 has been stepped to the end, it emits a signal on line 240 to interrogate the signal conditions on line Q1*a*, Q2*a* and Q8*a* from comparator 132. One of these three lines will be conducting a signal at this time. If it is line Q2*a* (associated with comparator input line Q2 of FIG. 2*a*) a machine order is given to withdraw the character name at the particular P2 stage of register 44 shown shaded in FIGS. 2*a* and 5. Note that line Q2 of FIG. 2*a* is the line which is operatively associated with each of the phase positions P2 of register 42. Owing to the averaging effect of the best correlation signals by logic networks 106 and 108, it is not necessarily true that all of the phase positions P2 must contain an optimum signal. Rather, the comparator 132 providing an output on line Q2*a* means that the summarized signals at these phase positions were better than in the signals examined in the other groups of phase positions. Further, the gap control logic at 142 and 144 provides a bias on the logic networks 106 and 108 (described before) such that a gap or clear space between printed characters overrides other considerations in the decision which is made to call the character identity from register 44.

As mentioned, the signal on line 240 resulting from the stepping of the timing control register to its end, is used to interrogate the three lines Q1*a*, Q2*a*, Q8*a* to determine which of the three is conducting a signal. We also mentioned that if line Q2*a* is the line with a signal at the time of interrogation, a logical instruction is given to withdraw the character name from register 44 at the particular stage P2 shown in FIG. 5. This is accomplished in the following way. The signal on line 240 is conducted over lines 246, 248, and 250 to three AND gates 252, 254, and 256. The lines Q2*a*, Q1*a* and Q8*a* form the other inputs to the respective gates 252, 254, and 256. Since, in our example, only line Q2*a* is conducting a signal at this time, gate 252 provides a signal on its output line 260 which passes OR gate 262 and is conducted on the output line 264 to which interrogation buss 266 is attached. The interrogation buss conducts a signal to a set of gates 268 whose other inputs are on the conductors of cable 194. As shown in FIG. 5 these conductors are attached to the respective positions of the P2 phase position of register 44. Output lines 270 from the set of gates 268 constitute inputs to a character-name output register 272 whose output lines are housed within cable 196 and are operatively connected with utilization device 200 of any form. It is convenient, however, that the utilization device have means to provide a receipt signal on line 202 which is used to clear the character-name output register 272 as illustrated in FIG. 5.

Inasmuch as the character name is withdrawn from register 44, the timing control shift register 230 is restarted by a signal fed back from gate output line 260, by way of line 280 to the OR gate 236. This provides a new pulse in the single-pulse shift register 230 by means of pulse line 226. Thereafter timing control shift register 230 is stepped by the shift pulses on line 90 which pass gate 218 and are conducted to the stepping terminal of register 230 over line 222. It is understood that the shift pulses on line 90 are synchronized with the entry of codes into registers 42 and 44 as shown best by tracing the trigger lines 72, 73, 74 and the connected shift lines 90 and 92 in FIGS. 2 and 2*a*.

At the time of interrogation of gates 252, 254 and 256, should line Q1*a* be conducting a signal, the logic following its AND gate 254 is such that the instruction for withdrawing the character name from register 44 is delayed for one phase. This is accomplished by setting flip-flop 284 with the output of gate 254 conducted on line 286. The output on line 288 from flip-flop 284 provides a standing signal forming one input to AND gate 290. The other input to this gate is taken from lines 240, 246 by way of line 292 in which there is a one-phase delay 294. The output line 296 from delay 294 constitutes the only other input to AND gate 290. Thus, the output line 298 of AND gate 290 is passed through OR gate 262 to ultimately interrogate the set of gates 268 to output the character name code from the illustrated phase P2 stage of register 44. As before, the signal on line 298 is fed back on line 300 through the OR gate 236 to insert a new pulse into the timing control shift register 230.

If there is a signal on line Q8*a* at the time of interrogation of gates 252, 254 and 256, the instruction for withdrawing the character name code from register 44 is delayed for two phases as follows. The signal on line Q8*a* is gated at 256 with the interrogation pulse on lines 240, 246 and 250 to produce an output on the gate output line 302 which sets flip-flop 304. The flip-flop output line 306 forms one input of one AND gate 308, while the other input of the AND gate is taken from the delay line 296 by way of a further delay line 310. This further delay line has a delay corresponding to one phase. Upon coincidence occurring at gate 308 the gate output is conducted on line 312 which is OR gated at 262 to pass an interrogation signal for the set of gates 268, thereby withdrawing the character name code from phase position P2 of register 44. Here again, a new timing pulse is entered into shift register 230 by means of feed back line 318 connected to line 312 and to the OR gate 236. In all three cases of Q1*a* or Q2*a* or Q3*a* conducting a signal, flip-flops 304 and 284 are cleared at the proper time by the output of OR gate 262 on line 264.

OPERATION

The operation of a typical reading machine embodying our invention has been described with the description of its components and subassemblies. However, the operation can be summarized as follows: A sample length of print sufficiently large to contain a plurality of characters, is examined by the conventional scanner of a reading machine. After each scan of the sample (FIG. 1) or after each group of scans (FIGS. 2 and 2*a*), the optimum correlation signal is stored. Assuming the most common type of scanner, this would mean that the optimum correlation signals (or rejection signals) are stored after each vertical "slice" or group thereof. Scanning resolution is such that as the print length sample is so examined, more than one optimum correlation signal for each character thereon will be stored. In this way the stored optimum signals correspond to the characters of the sample, and they can be examined in the several positions which they occupied when the optimum correlation signals were stored.

Inasmuch as it is easier to shift binary codes than analog signals, the storage of the best signals is accomplished by encoding the analog optimum correlation signals and loading the codes (representing the value of the correlation signals) into a shift register in time with the scanning of the print length sample or the coursing of the scan-extracted data as it courses through another part of the machine. As the correlation signals step through register 42, the digital codes are converted to analog signals and processed by logic networks 106 and 108 (FIG. 2*a*). Although any section of register 42 can be selected, section 43 is used to obtain certain data necessary (on cable 192 of FIG. 2*a*) for the functioning of the logic control network 190. In addition, it will be noted that the lines extending vertically downwardly from the converters 98 at section 43 of register 42, are directly resistively coupled (without gating) to the group of lines Q1 . . . Q8. The remainder of the converter outputs are processed by logic networks 106 and 108 prior to resistive coupling with the same lines Q1 . . . Q8. The analog conversions of the best correlation codes in section 43 of register 42 are directly resistively coupled with the Q1 . . . Q8 lines. Thus, the optimum positions or positions of a character which is represented in section 43 (by the correlation signals) are used directly in computing the optimum position of that character for ultimate identification. On the other hand, logic networks 106 and 108 are so constructed that the best correlation signal at a given phase position with respect to its two neighboring phase postions is used to the exclusion of poorer adjacent signals. In the logic network 106 (FIG. 4) for example, an eight volt signal on line 114*a* is not only conducted to line Q2 but is also conducted by lines 130 and 122*a* to be impressed on lines Q1 and Q3 in preference to signals poorer than eight volts which would be extracted from the neighboring phase positions. This has the effect of stressing the better or best of two or more positions of characters which may be represented to the right and to the left of section 43 of register 42. Comparator 132 selects the Q line having the optimal signal thereon. In the interest of simplicity the selection is made between lines Q1, Q2 and Q8 which are related to phase positions P1, P2 and P8 in section 43 of register 42.

The control logic network 190 is so designed that an ultimate read trigger signal is developed after a correction depending on which of the three lines Q1*a*, Q2*a* or Q8*a* conducts a signal to network 190. The effect of the correction is to utilize the read trigger signal at once or delay it for either one or two phase times before utilization. The read trigger signal is used to withdraw the name of the character whose optimum signal is located at a given position (P2) in section 43 of register 42 at the time of the trigger signal. Inasmuch as the name of the character associated with the optimal correlation signal is avalable each time that an optimal correlation signal is made available in the reading machine, the character names in the form of codes are loaded into a shift register 44. This shift register is synchronized with register 42 so that the character names codes synchronously move with the correlation codes. Thus, the read trigger signal is used to withdraw the character name from the register 44 for impression upon a utilization device 200.

While it is conventional to use clear spaces between adjacent printed charatcers to trigger the decision section of a reading machine, in one illustrated form of our invention we use the space signal (when it is available, i.e. if adjacent characters do not touch) in a heavily weighted manner to influence the selected optimal position at which the character is ultimately identified. This has been described before (gap register 140, gap controlled logic 142 and 144) and therefore the details are not repeated.

It is understood that numerous changes may be made without departing from the protection of the following claims.

What is claimed is:

1. In a reading machine to read characters formed in a line on a document where the characters are printed on a nominal pitch, scanning means to examine an area on the document at successive locations along the length of the line for a predetermined distance and wherein said successive locations are spaced more closely than the characters on said pitch, a character criterion for each character in the machine vocabulary, means for comparing the outputs of said scanning means to said criteria for providing correlation signals for each successive area examined over said distance, means for processing and storing said correlation signals in a manner such that the stored signals represent the character criteria matching best with the outputs of said scanning means, examination of said examined successive area, means responsive to said stored signals for determining the nominal pitch of the characters and for providing trigger signals corresponding to said pitch, and means responsive to said trigger signals for providing character identity outputs.

2. The subject matter of claim 1 and means for recording the tentative identities of the character upon determination thereof by means of said correlation signals, and said means which provide character identity outputs providing said outputs by withdrawing said recorded tentative identities in response to said trigger signals.

3. The subject matter of claim 1 wherein said processing storing means include a best correlation signal memory to store values of best correlation signals for a plurality of said area examinations, and said pitch determining means including logic means which respond to a plurality of said values for said areas combined with adjacent areas in determining said pitch.

4. In a reading machine to read characters formed in a line on a document, a scanner to examine an area at successive locations along the length of the line for a predetermined distance and wherein said successive locations are spaced more closely than the characters in said line, means including a character criterion for each character in the machine vocabulary, for providing signals indicating character identity and indicating the degree of match between said criteria and the optical content of said area at said successive locations and indicating the location of the area being examined, means for storing said signals, means responsive to said stored signals for determining the pitch of the characters along said length of the line and for providing trigger signals corresponding to said pitch, and means responsive to said trigger signals for providing the identities of the scanned characters of the line.

5. The reading machine of claim 3 wherein said storing means store the signals that result from the best match between the optical content of said area and said criteria, at each successive location along the length of the line.

References Cited

UNITED STATES PATENTS

| | | | |
|---|---|---|---|
| 2,935,619 | 5/1960 | Rogers. | |
| 3,102,995 | 9/1963 | Abbott | 340—146.3 |
| 3,111,645 | 11/1963 | Milford | 340—146.3 |
| 3,111,646 | 11/1963 | Harmon | 340—146.3 |
| 3,112,469 | 11/1963 | Milford | 340—146.3 |
| 3,114,132 | 12/1963 | Trimble et al. | 340—146.3 |
| 3,123,804 | 3/1964 | Kamentsky. | |

DARYL W. COOK, Primary Examiner

R. M. KILGORE, Assistant Examiner

U.S. C.L. X.R.

235—61.11